Figure 1:
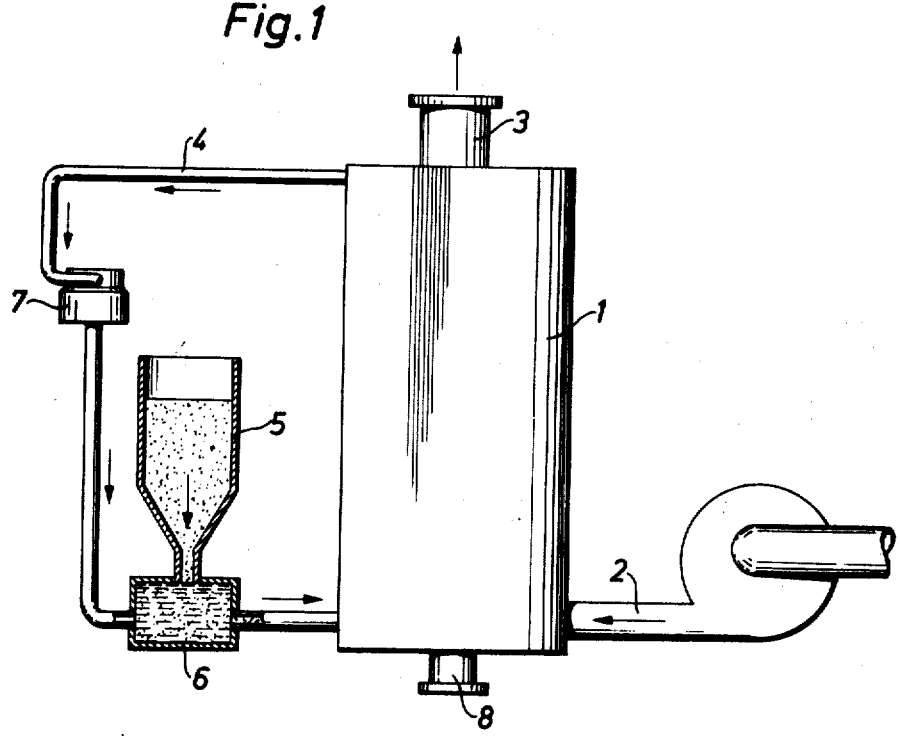

United States Patent [19]

Gustavsson

[11] 3,708,266

[45] Jan. 2, 1973

[54] APPARATUS FOR CLEANING SULPHUR DIOXIDE-CONTAINING FLUE GASES

[75] Inventor: Karl Axel Goran Gustavsson, Enkoping, Sweden

[73] Assignee: Aktiebalaget Bahco Ventilation, Enkoping, Sweden

[22] Filed: July 24, 1970

[21] Appl. No.: 57,983

[30] Foreign Application Priority Data

Aug. 29, 1969 Sweden..............................12030/69

[52] U.S. Cl...........................23/283, 55/228, 55/73, 55/249, 261/17, 261/21, 261/119, 241/46.15, 423/242
[51] Int. Cl................................................B01j 1/22
[58] Field of Search........23/283, 260, 252, 285, 286, 23/25 Q; 55/229, 228, 73; 261/17; 241/46.15, 16, 39

[56] References Cited

UNITED STATES PATENTS

| 3,608,281 | 9/1971 | Gustavsson | 55/228 |
| 2,142,406 | 1/1939 | Nonhebel et al. | 23/260 |
| 2,080,779 | 5/1937 | Lessing | 23/25 Q |
| 1,632,340 | 6/1927 | Kipper | 23/286 |
| 3,514,283 | 5/1970 | Griffith | 23/4 X |

FOREIGN PATENTS OR APPLICATIONS

| 615,652 | 1/1949 | Great Britain | 241/39 |

OTHER PUBLICATIONS

Potter et al. "Limestone–Dolomite Processes for Flue Gas Desulfurization" Air Engineering, April 1969, pp. 22-27.

Pearson et al., Jan. 17, 1935; The Removal of Smoke and Acid Constituents from Flue Gases by a Non-Effluent Water Process, pp. 1, and 21-24.

*Primary Examiner*—James H. Tayman, Jr.
*Attorney*—Stevens, Davis, Miller & Mosher

[57] ABSTRACT

In an apparatus for cleansing flue gases containing sulphur dioxide, an absorbent material slurry is circulated through or adjacent the bottom of an upstanding absorption column through which the flue gas passes. A grinding mill is provided in the circulation system for the slurry so as to remove the sulphite and/or sulphate compounds which coat and inactivate the particles of absorbent material and to expose additional active surface.

6 Claims, 3 Drawing Figures

PATENTED JAN 2 1973 3,708,266

SHEET 1 OF 2

APPARATUS FOR CLEANING SULPHUR DIOXIDE-CONTAINING FLUE GASES

The present invention relates to an apparatus for cleansing sulphur dioxide-containing flue gases, and more particularly to such an apparatus in which sulphur dioxide is washed from flue gases originating from coal or oil-fired systems in a co-current absorption column having an inlet and an outlet for the flue gases and a circulating system for an absorbent liquid which comprises a slurry of a sulphur dioxide absorbing substance such as calcium carbonate in the form of powdered limestone and which is used to wash the sulphur dioxide from said gases.

When washing sulphur dioxide from flue gases by means of an apparatus of the type referred to, the carbonate particles become coated with a layer of sulphite/sulphate, forming a barrier which prevents contact between the sulphur dioxide and the active carbonate in the interior of the particle, thereby preventing it from being used.

Because of the difficulty in dissolving the carbonate in the washing liquid, it is normally necessary to grind the limestone to a very high degree of fineness before introducing it into the process, since a limited affinity must be replaced with a wide reaction surface. This necessity of grinding the limestone to fine limits involves high costs.

The object of the present invention is to circumvent the aforementioned disadvantages by providing an apparatus of the aforedescribed type in which the circulation system includes a mill for grinding the reacted slurried absorbent particles.

The absorbent slurry circulated through the apparatus of the present invention is subjected to continuous grinding, wherewith the shielding layer of reaction products around the particles is crushed and removed. Furthermore, the absorbent particles are subjected to additional grinding and consequently it is possible to supply to the system a coarser absorbent material than has previously been the case, which material, since it need not be ground to the same degree of fineness, is thus less expensive to purchase.

Figure 2:
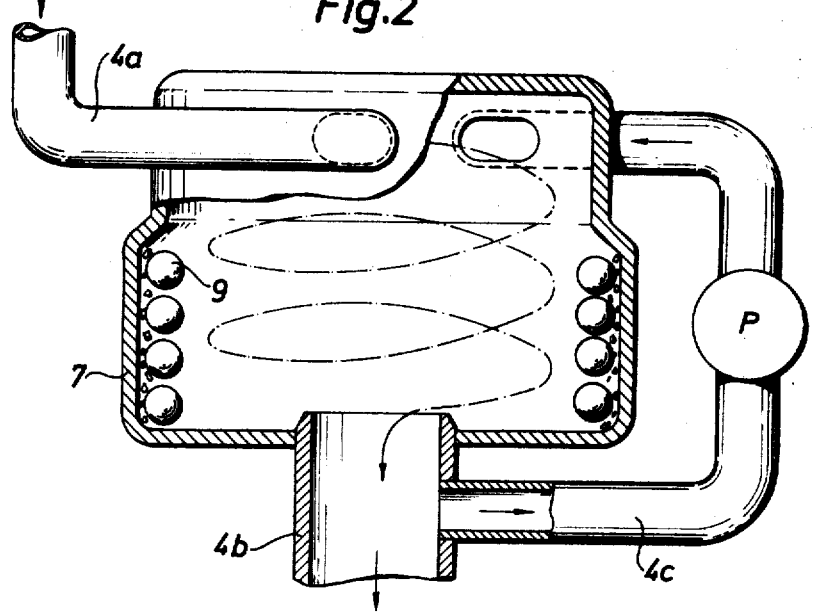
Figure 3:
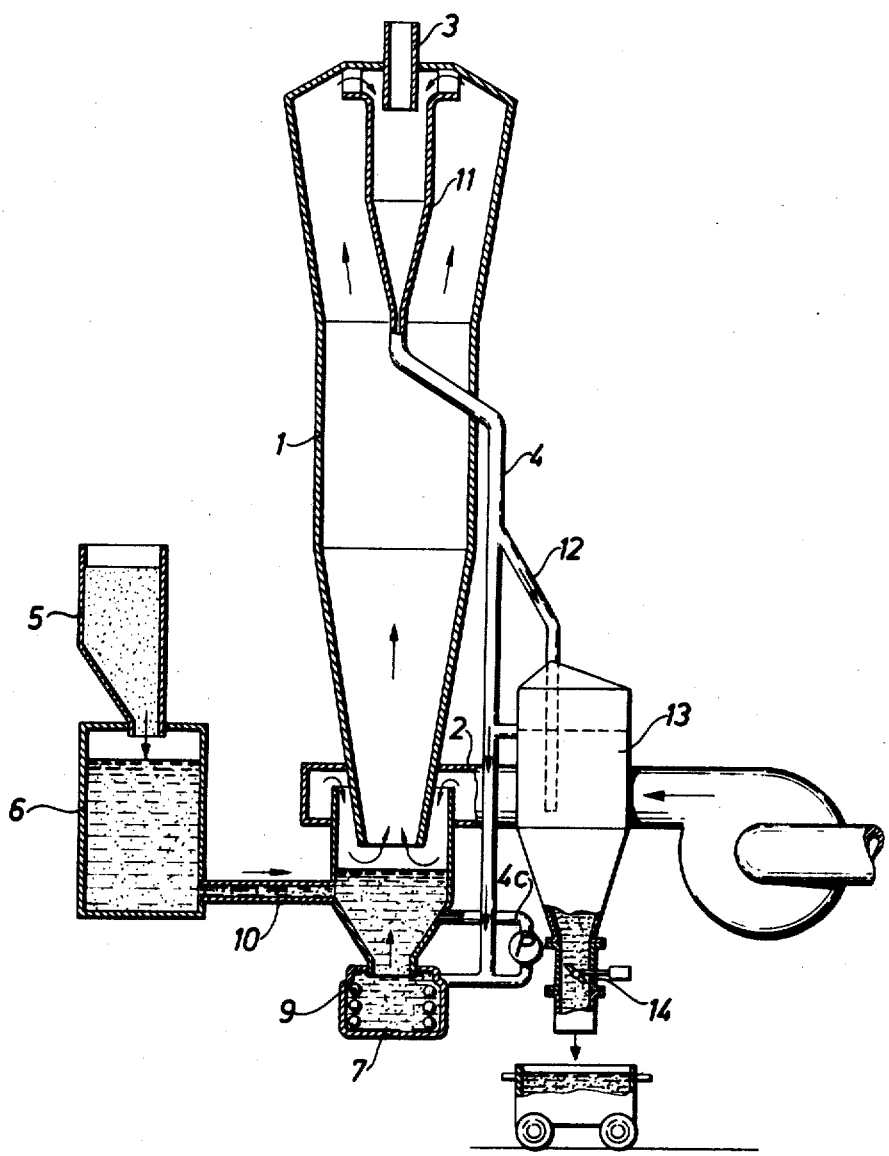

The invention will now be described with reference to accompanying drawings, in which FIG. 1 is a diagrammatic view of an embodiment of the apparatus according to the invention, FIG. 2 is a cross section of a preferred embodiment of the mill embodied in the apparatus, and FIG. 3 is a cross section of another embodiment of the apparatus according to the invention.

The apparatus illustrated diagrammatically in FIG. 1 comprises an absorption column 1, having at the bottom thereof an inlet 2 for sulphur dioxide-containing crude gas, and at the top thereof an outlet 3 for gas cleansed of sulphur dioxide. Also connected to the column is a circular conduit 4, through which fresh calcium carbonate absorbent material taken from a supply vessel 5, is introduced via a preparation vessel 6 in the form of a slurry. The active absorbent slurry is entrained by the crude gas entering the column through the inlet 2, and is carried up through the column, whereupon the sulphur dioxide contained in the gas is reacted with the calcium carbonate particles to form an inactivating sulphite/sulphate layer thereon. The slurry is separated in a droplet separator not shown, while the gas cleansed of sulphur-dioxide is removed through the outlet 3. The reacted absorbent slurry is removed from the droplet separator through the circulation conduit 4 and returned to the process via the preparation vessel 6. Situated before the vessel 6 is a suitable grinding mill or crushing device 7 in which the absorbent particles are ground down to the required grain size while removing the surrounding inactivating coatings of sulphite/sulphate therefrom. The consumed absorbent material is then discharged through an outlet 8 provided in the bottom of the column.

The mill 7 illustrated in DIG. 2 is a preferred embodiment and is connected in the circulation conduit 4 in a manner whereby the upstream portion 4a of the conduit is connected tangentially to the mill 7, which has the shape of a body of revolution, and constitutes the inlet to said mill, and the downstream portion 4b of the conduit departs centrally from the bottom of the container with the end thereof projecting slightly into said container and comprising the outlet therefrom.

A portion of the flow from the mill 7 is passed to a circulation conduit 4c which is connected to the downstream portion 4b and in which the part flow is imparted, by means of a pump P, the additional kinetic energy necessary to effect the grinding operation, whereafter said part flow is passed back to the mill and caused to flow substantially tangentially into the mill, level with the inlet 4a. The kinetic energy of the main flow entering through this inlet is thus increased to an extent sufficient to enable the grinding operation to be effected satisfactorily.

Alternatively the pump can be connected in front of the mill and in series therewith.

Under favorable circumstances, for example when very tall columns are used, the kinetic energy possessed by the flow entering the mill may in itself be sufficient to effect the grinding operation whereby the circulation conduit with the pump can be excluded. The material is primarily ground by grinding bodies 9 incorporated in the container and being suitably spherical in shape, the bodies being thrown by the tangentially entering absorbent flow as a result of centrifugal force against the walls of the container, to grind the particles of absorbent material located between the grinding bodies and the bodies and the container walls to the desired grain size. As a result of the centrifugal force, larger and heavier absorbent particles will be forced out towards the walls of the container, where they themselves act as grinding bodies while being crushed to lighter, active particles, which wander in towards the center of the container and depart therefrom with the suspension liquid through the outlet. In certain cases special grinding bodies can therefore be excluded and the grinding work completely assigned to the absorbent material itself.

In the embodiment illustrated in FIG. 3 like elements are identified with the same reference numerals as those in FIGS. 1 and 2.

The embodiment of FIG. 3 differs from the embodiment of FIG. 1 inasmuch as the supply of fresh absorbent material and the circulation circuit are differently arranged. Thus, the absorbent material supply vessel 5 is connected via the preparation vessel 6 with the column by an inlet 10, which is completely separated from the circulation circuit. Furthermore, the mill 7 with the grinding bodies 9 forms an integrated portion of the column bottom, to which portion the absorbent slurry is passed from a droplet separator 11 at the top of the column through the circulation conduit 4. Directly above the mill 7 is a container where the slurry contacts the incoming flue gas. This conduit is provided with a branch conduit 12, which conducts a minor portion of the circulation liquid to a separating vessel 13, from which consumed absorbent material is removed through a valve 14. Finally, the circulation circuit is provided with a pump circuit as shown in FIG. 2, with which, however, the intake thereof is directly connected with the column bottom and its outlet opens out in the circulation conduit 4.

The invention has been described with reference to a calcium carbonate absorbent material. It will be understood, however, that the apparatus of the invention can also be used with other absorbents where the problem is the same.

What is claimed is:

1. An apparatus for cleaning flue gases containing sulphur dioxide comprising:
   a. an upstanding absorption column having an outlet near its upper end for flue gases and an open bottom defining an inlet;
   b. a container below said open bottom for a slurried sulphur dioxide-absorbent material with the top of said container and the bottom of said column defining a tortous passage for the incoming flue gas to pass against and over the surface of slurry therein to entrain the slurry so that it is carried upward with the flue gases in said column to absorb gases while being so carried;
   c. sedimentation vessel external of said column having a valve for discharge of consumed slurry;
   d. a grinding mill positioned lower than said column for grinding reacted slurry so as to remove any inactivating coating from the slurry particles, the outlet of said mill being in communication with said container;
   e. a droplet separator within the column near its outlet;
   f. a generally vertically extending conduit from said droplet separator in communication with both said sedimentation vessel and the inlet of said grinding mill so that a portion of the circulated slurry may be diverted in the sedimentation vessel and the remainder directed to the mill for grinding and recirculation through said container.

2. The apparatus of claim 1 in which the conduit from said droplet separator is arranged to permit the mill to be operated by the circulated slurry itself.

3. The apparatus of claim 2 in which the height of the droplet separator above the mill is such that the mill is operated by the kinetic energy of the slurry.

4. The apparatus of claim 1 in which a pump is connected in series with the mill to impart kinetic energy to the slurry for grinding.

5. The apparatus of claim 1 in which a pump is connected in parallel to the mill to impart kinetic energy to the slurry for grinding.

6. The apparatus of claim 1 including a supply vessel for fresh absorbent material connected to said container.

* * * * *